United States Patent
Manning

(10) Patent No.: US 10,409,142 B1
(45) Date of Patent: Sep. 10, 2019

(54) ADAPTER FOR MULTIPLE CAMERAS

(71) Applicant: James Manning, Bruce, MI (US)

(72) Inventor: James Manning, Bruce, MI (US)

(*) Notice: Subject to any disclaimer, the term of this patent is extended or adjusted under 35 U.S.C. 154(b) by 0 days.

(21) Appl. No.: 15/905,849

(22) Filed: Feb. 27, 2018

(51) Int. Cl.
*G03B 17/56* (2006.01)

(52) U.S. Cl.
CPC .................. *G03B 17/561* (2013.01)

(58) Field of Classification Search
None
See application file for complete search history.

(56) References Cited

U.S. PATENT DOCUMENTS

| | | | | |
|---|---|---|---|---|
| 4,488,794 A * | 12/1984 | Dolgow | ............... | G03B 17/24 396/30 |
| 4,740,804 A * | 4/1988 | Shands | ............... | G03B 15/03 248/182.1 |
| 9,482,930 B1 * | 11/2016 | Ritch | ............... | G03B 17/561 |
| 9,554,639 B1 * | 1/2017 | Harden | ............... | A45F 5/00 |
| 9,588,407 B1 * | 3/2017 | Harrison | ............... | G03B 17/561 |
| 2005/0265711 A1 * | 12/2005 | Heibel | ............... | B60R 11/04 396/419 |
| 2007/0229655 A1 * | 10/2007 | Ellison | ............... | A61B 1/00142 348/73 |
| 2010/0155549 A1 * | 6/2010 | Robinson | ............... | F16M 11/10 248/183.1 |
| 2011/0017896 A1 * | 1/2011 | Bordignon | ............... | F16M 1/04 248/310 |
| 2011/0129210 A1 * | 6/2011 | McGucken | ............... | F16M 13/02 396/422 |
| 2012/0189292 A1 * | 7/2012 | Kim | ............... | G03B 15/03 396/198 |
| 2013/0236235 A1 * | 9/2013 | Johnson, Sr. | ............... | F16C 11/04 403/53 |
| 2015/0261071 A1 * | 9/2015 | Shiffler | ............... | G03B 17/561 396/419 |
| 2015/0323855 A1 * | 11/2015 | Overall | ............... | G03B 17/561 396/419 |
| 2018/0239224 A1 * | 8/2018 | Johnson | ............... | G03B 37/02 |
| 2018/0335684 A1 * | 11/2018 | Strauser | ............... | G03B 17/561 |

* cited by examiner

*Primary Examiner* — William B Perkey
(74) *Attorney, Agent, or Firm* — The Iwashko Law Firm, PLLC; Lev Ivan Gabriel Iwashko

(57) ABSTRACT

An adapter to attach to a digital camera and a video camera simultaneously, the adapter including a first attachment portion to attach to a top portion of the digital camera, and a second attachment portion to attach to a bottom portion of the video camera.

3 Claims, 2 Drawing Sheets

ADAPTER FOR MULTIPLE CAMERAS

BACKGROUND

1. Field

The present general inventive concept relates generally to a camera adapter, and more particularly, an adapter for multiple cameras.

2. Description of the Related Art

Photography allows individuals to capture still and/or moving images, but it can be hard to detain multiple forms of cinematography at once when using only one camera. Juggling two cameras at a time can be difficult and cumbersome without the assistance of another person to help and can risk the opportunity of seizing a onetime shot.

Therefore, there is a need for a device that allows two different cameras to be used simultaneously.

SUMMARY

The present general inventive concept provides an adapter for multiple cameras.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an adapter to attach to a digital camera and a video camera simultaneously, the adapter including a first attachment portion to attach to a top portion of the digital camera, and a second attachment portion to attach to a bottom portion of the video camera.

The first attachment portion may fit into a universal flash mount disposed at the top portion of the digital camera, and the second attachment portion fits into a tripod mount disposed at the bottom portion of the video camera.

The adapter may further include a rotating portion disposed between the first attachment portion and the second attachment portion to rotate the second attachment portion with respect to the first attachment portion.

The adapter may further include a center portion disposed between the second attachment portion and the rotating portion.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
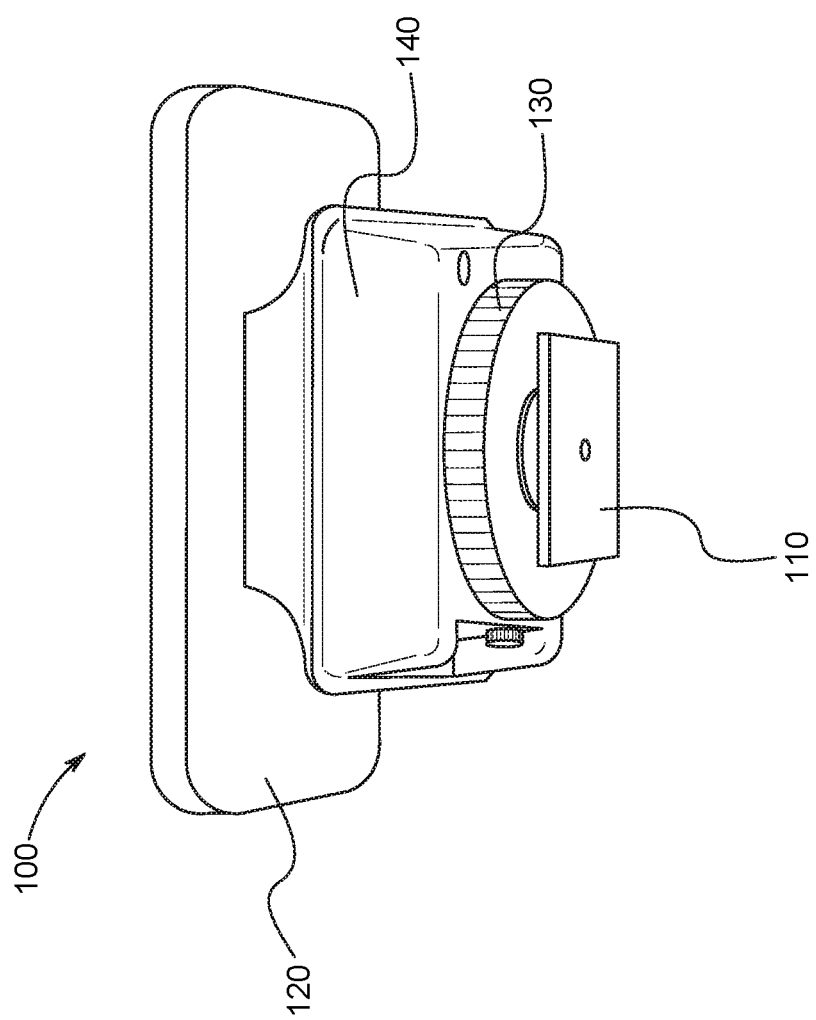
FIG. 1 illustrates a bottom angled perspective view of an adapter, according to an exemplary embodiment of the present general inventive concept.

FIG. 1 illustrates a bottom angled perspective view of an adapter 100, according to an exemplary embodiment of the present general inventive concept.

Figure 2:
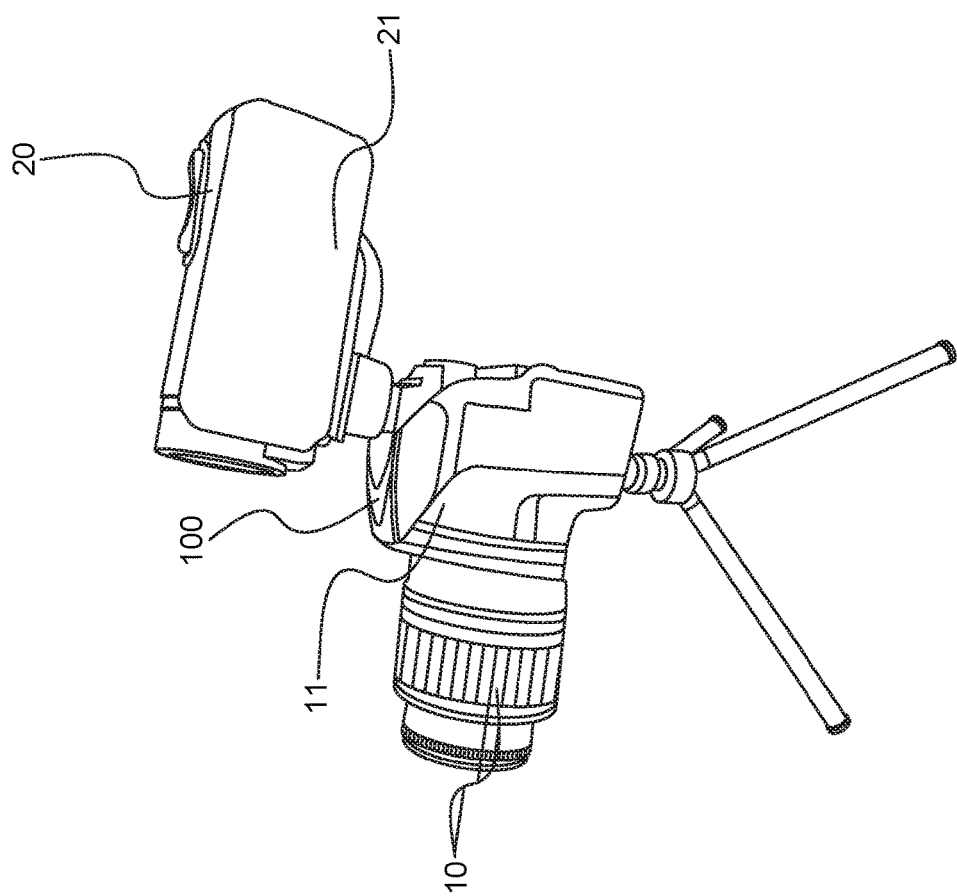
FIG. 2 illustrates a side perspective view of a digital camera connected to a video camera via the adapter, according to an exemplary embodiment of the present general inventive concept.

FIG. 2 illustrates a side perspective view of a digital camera 10 connected to a video camera 20 via the adapter 100, according to an exemplary embodiment of the present general inventive concept.

Referring to FIGS. 1 and 2, digital camera 10 may include a camera that may capture still images and video recordings, but typically has a shape of a still-photo camera. The digital camera 10 may also be a camera that takes film. The video camera 20 may include a camera that may capture video recordings and still images, but typically has a shape of a video camera. The video camera 20 may include a video camera that records and stores images using cassettes, internal memory, and/or removable discs.

The adapter 100 may include a first attachment portion 110, a second attachment portion 120, a rotating portion 130, and a center portion 140.

The first attachment portion 110 may include a shape and size that may fit into a universal flash mount 11 disposed on a top portion of the digital camera 10.

The second attachment portion 120 may include a shape and size that may fit into a tripod mount 21 disposed on a bottom portion of the video camera 20.

The first attachment portion 110 may be attached to the second attachment portion 120 via the center portion 140.

The rotating portion 130 may be disposed between the first attachment portion 110 and the center portion 140, and may allow the second attachment portion 120 (and the center portion 140) to optionally rotate with respect to the first attachment portion 110. In other words, the center portion 140 may be disposed between the second attachment portion 120 and the rotating portion 130. As such, when the first attachment portion 110 is attached to the universal flash mount 11 of the digital camera 10 and the second attachment portion 120 is attached to the tripod mount 21 of the video camera 20, the video camera 20 may rotate with respect to the digital camera 10.

Accordingly, a user may capture still photographs with the digital camera 10 while the video camera 20 records moving images.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An adapter to attach to a digital camera and a video camera simultaneously, the adapter comprising:
   a first attachment portion having a first planar surface to attach to a top portion of the digital camera;
   a second attachment portion having a second planar surface to attach to a bottom portion of the video camera, such that the second attachment portion has a length greater than a length of the first attachment portion;
   a rotating portion disposed between the first attachment portion and the second attachment portion to rotate the second attachment portion with respect to the first attachment portion; and
   a center portion, comprising:
      a top portion disposed on the second attachment portion, such that the top portion is concave on a first side of the top portion and concave on an second side of the top portion, and
      a bottom portion disposed on the rotating portion, such that each side of the bottom portion slopes at least partially toward the rotating portion.

2. The adapter of claim 1, wherein the first attachment portion fits into a universal flash mount disposed at the top portion of the digital camera, and the second attachment portion fits into a tripod mount disposed at the bottom portion of the video camera.

3. An adapter to attach to a digital camera and a video camera simultaneously, the adapter comprising:
   a square prism attachment portion disposed on a first end of the adapter to attach to a top portion of the digital camera;
   a rectangular prism attachment portion rotatably disposed on a second end of the adapter to rotate in response to the video camera recording a moving image;
   a rotating portion disposed between the square prism attachment portion and the rectangular prism attachment portion to rotate the rectangular prism attachment portion with respect to the square prism attachment portion; and
   a center portion, comprising:
      a top portion disposed on the rectangular prism attachment portion, such that the top portion is concave on a first side of the top portion and concave on an second side of the top portion, and
      a bottom portion disposed on the rotating portion, such that each side of the bottom portion slopes at least partially toward the rotating portion.

* * * * *